Patented Jan. 3, 1933

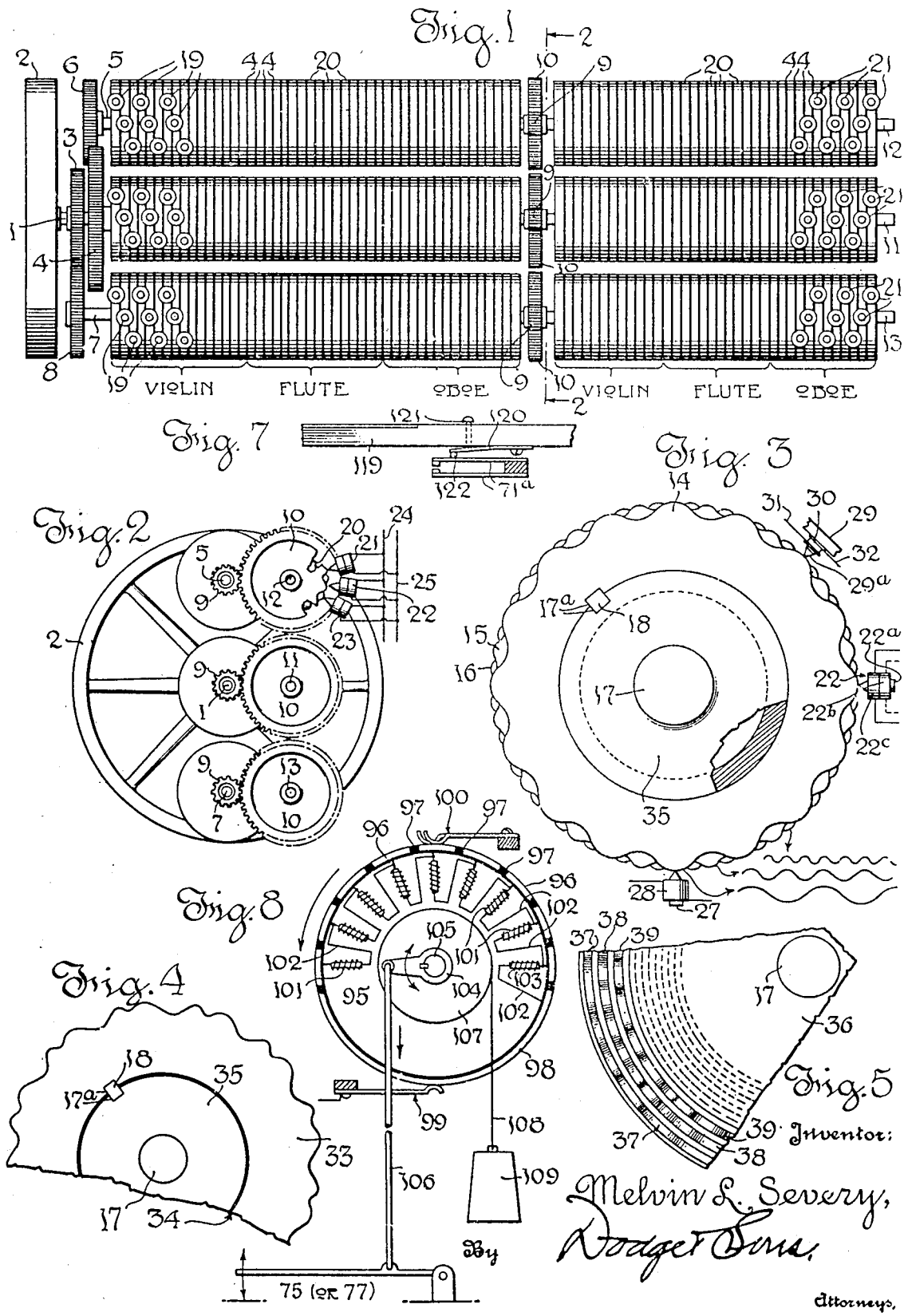

1,893,250

UNITED STATES PATENT OFFICE

MELVIN L. SEVERY, OF LOS ANGELES, CALIFORNIA, ASSIGNOR TO THE VOCALSEVRO COMPANY, OF LOS ANGELES, CALIFORNIA, A CORPORATION OF DELAWARE

METHOD OF AND MEANS FOR PRODUCING COMPOUND TONES OF PREDETERMINED MUSICAL QUALITY

Application filed December 31, 1928. Serial No. 329,647.

This invention relates more particularly to a musical instrument having for each of the various pitches of its range or gamut, one or more qualities of tone, each note of given quality being derived from electrical undulations set up by a moving member provided with wave-producing means representing, in correct proportion, the necessary partial components of the predetermined timbre desired.

An important object of this invention is the production of a relatively small, compact and inexpensive musical instrument adapted to produce, to enlarge, and to play with orchestral effect, various qualities of tone, and to select, control and grade the same at will.

In musical instruments making use of a scale tuned in equal temperament and depending for the musical pitches of such scale upon rotating or relatively moving members producing pulsations, all such pulsations, including those representing the well-known incommensurate ratios subsisting between certain notes of each octave, can be secured or approximated with an accuracy sufficient for all practical purposes, by the employment of six rotating members for an instrument of a range of seven octaves. More rotating or travelling members may be used, but for simplicity and cheapness I prefer the smallest feasible number of moving members.

In the preferred embodiment of my invention I employ, for convenience and economy, a laminated or stacked timbre-form of magnetic substance, rotating in proximity to the pole or poles of a magnet or other pulsation-producing device, in such manner as to create electrical undulations having the wave-form characteristics of such timbre-form.

In addition to the broader features of the invention, means are provided whereby the desired tone qualities may be selected, their relative degrees of loudness may be controlled at will, and the artistic expression of the whole may be at all times governed with ease and precision by the player. Other details pertaining to the construction, assembling, and co-action of the parts will be made apparent as the description proceeds.

As here illustrated the invention is embodied in a series of six correctly timed rotors, each carrying timbre-forms for the production of tones of three distinct qualities, as for example, violin, flute, and oboe, for the eighty-four notes of a seven octave instrument. The face or periphery of each of these timbre-forms is provided with sixteen, seventeen, eighteen or nineteen teeth or crests, or some proper multiple thereof, up to and including one hundred and fifty-two teeth or crests for the fundamental of the highest note of the upper octaves in a seven octave instrument.

The term "tone qualities" or its equivalent, is used in this description as meaning the characteristic sounds of different instruments or approximations thereof, as the voilin, flute and oboe here used as illustrative examples. The word "timbre", as applied to a compound tone, is used to express that quality due to the sounding of its first partial, prime or fundametal simultaneously with its other partial components, each one of the selected partials speaking at the relative degree of intensity characteristic of the quality or timbre of said compound tone.

The invention is illustrated in the accompanying drawings, in which:

Fig. 1 is a front elevation of the rotors carrying the timbre-forms of my invention;

Fig. 2 is an end elevation of the same looking in the direction of the arrows in Fig. 1;

Fig. 3 is a side face elevation of a stacked timbre-form with associated means for generating electrical pulsations;

Fig. 4 is a fragmentary face view of an integral timbre-form adapted to produce electrical pulsations of the wave-characteristics of a compound tone;

Fig. 5 is a fragmentary face view of a disk-type carrier for timbre-forms, showing portions of three timbre-forms concentrically arranged on its flat or side face;

Fig. 7 is a side elevation of a portion of one of the manual keys of the instrument with its associated contact mechanism;

Fig. 8 is an enlarged view of one form of expression-control device suitable for use in the instrument.

Figure 6:
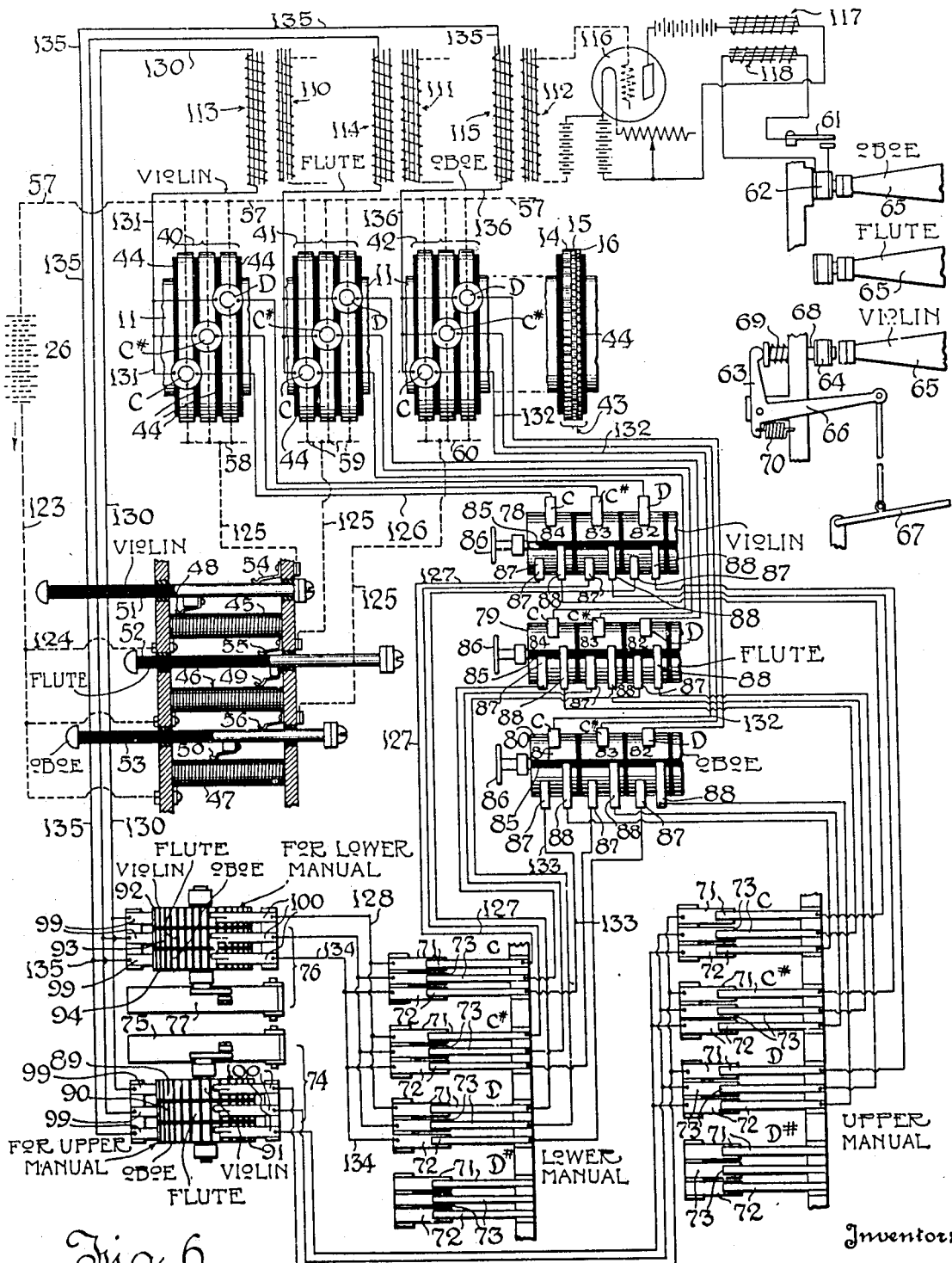
Fig. 6 is a view showing the essential operative parts of the instrument and their general relation one to another, only one of the rotors being there shown and this in fragmentary form.

All of the figures of the drawings are more or less diagrammatic, Fig. 6 being a schematic drawing or general plan showing the various parts of the instrument, the wiring thereof, and its several control devices or elements. These may in practice be variously located as determined by convenience of access and space available.

Referring first to Fig. 1 which shows in elevation two groups of three rotors each, the numeral 1 designates the shaft of the intermediate rotor of the left-hand group, which as seen in said figure is made up of rotors of greater length than those of the right-hand group. Shaft 1 carries at its end a fly-wheel 2 and two gears 3 and 4, the gear 3 having sixty-three teeth and the gear 4 one hundred teeth. A shaft 5 above shaft 1 carries the upper rotor of this group, and at its end nearest the fly-wheel, a gear 6 bearing sixty-three teeth and arranged to mesh with the one-hundred-tooth gear 4 on shaft 1 of the intermediate rotor. Below shaft 1 is a shaft 7 carrying the lower rotor of the left-hand group and a gear 8 having fifty teeth which meshes with the sixty-three-tooth gear 3 of shaft 1. The rotors carried by shafts 1, 5 and 7 are built up of timbre-forms of the character hereinafter described. Each of said shafts 1, 5 and 7 carries at the end remote from the gears just described a pinion 9 bearing fifteen teeth, each of said pinions meshing with a gear 10 having one hundred and twenty teeth, said gears being carried by one or another of three shafts 11, 12 and 13 each carrying a rotor similar to those carried by shafts 1, 5 and 7 but of shorter length and having fewer timbre-forms. The arrangement of the gearing intermediate the rotors of the long and of the short groups is better seen in Fig. 2.

As the speeds of the individual rotors of the left-hand or longer group vary by reason of the varying gear ratios through which they are connected and driven, the speeds of the rotors of the right-hand or shorter group will correspondingly vary since each of the shorter rotors is rotated by identical gearing but the driving pinions 9 of such gearing make relatively different numbers of revolutions per minute. Thus shaft 12 rotates at one-eighth the speed of shaft 5, shaft 11 at one-eighth the speed of shaft 1, and shaft 13 at one-eighth the speed of shaft 7. By driving the fly-wheel 2 at nine hundred and seventy revolutions per minute, all parts of the mechanism will be caused to rotate at the correct speeds for the tempered scale when properly placed timbre-forms used as primes and adapted to generate sixteen, seventeen, eighteen and nineteen pulsations per revolution and their proper multiples, are employed. The several shafts are of course mounted and rotate in suitable fixed bearings, and the entire mechanism is housed in a suitable casing.

The foregoing description of the "gearing" employed to transmit from the initial or driving shaft to the associated rotors respectively, the relative speeds or numbers of revolutions for a given interval of time, is based upon toothed gearing, which is illustrated in the drawings. This is for clearness of explanation but it is to be understood that the term "gearing" is used in this specification in its broader or general sense, and comprehends and includes such well-known equivalent drives as sprocket wheels and chains, friction gear wheels, and belt and pulley drives of ordinary type.

As indicated in Fig. 1, each rotor of the left-hand or longer group carries forty-eight timbre-forms, which will usually be of the stacked or laminated type shown in Fig. 3, but only in outline in Fig. 1 or without attempting to indicate in said figure the separate annuli or laminae of the individual timbre-forms. Similarly, each rotor of the shorter right-hand group carries thirty-six such timbre-forms. It is to be understood, however, that more or fewer annuli or laminae may be employed in each timbre-form, and that more than three laminae will ordinarily be used for the timbre-forms of larger instruments, or where greater range of tone coloring is desired.

More or fewer timbre-forms may be called into action simultaneously, and the relative intensities of the composite tone may be varied at will, the permutations affording a wide range of tone coloring. To permit the undulations or alternate elevations and depressions of the timbre-forms to be made of adequate size, the annuli are of appropriate diameter, and are strung upon cylinders which may be made of hollow or tubular form for lightness, said cylinders being in turn carried upon shafts as 1, 5, 7, 11, 12 and 13 (Fig. 1), or provided with gudgeons or journals 17 at their ends as seen in Fig. 3.

In Fig. 3 is illustrated the preferred construction of the timbre-forms which make up the six rotors shown. These timbre-forms comprise laminae of annular form, the peripheral edges thereof being of sinusoidal or simple sinewave outline, but the number of teeth or crests of different timbre-forms varying according to the number of pulsations or undulations which each is intended to produce per rotation. Three annular laminae 14, 15 and 16 are indicated in Fig. 3, the lamina 14 having sixteen teeth or crests and producing the lowest or fundamental component of the desired tone, while the laminae 15 and 16 have thirty-two and forty-eight teeth or crests respectively, thus producing other components of the desired tone. By combining a suitable number of such timbre-forms of the requisite contour or outline and of proper thickness, a composite tone of predetermined pitch and quality may be produced. The central opening of each annulus or timbre-form is of diameter suitable to fit snugly upon the shaft or body of the rotor to which it belongs, and in practice each is provided with a notch or notches 17ᵃ to receive a spline, key or feather 18 by which the relative angular positions of associated disks are determined and maintained.

Referring again to Fig. 1, it will be seen that opposite the timbre-forms of the longer rotors carried by shafts 1, 5 and 7 are placed twenty-seven of the forty-eight electromagnets 19 necessary to serve the forty-eight timbre-forms 20 reserved for the four upper octaves of the violin section of the instrument. Opposite the oboe section of the shorter rotors carried by shafts 11, 12 and 13 are shown twenty-seven of the thirty-six electromagnets 21 necessary to provide the oboe quality for the three lower octaves of the instrument. It will be understood that each of the two hundred and fifty-two timbre-forms of the instrument will have at least one, and may have more than one, magnet or other pulsation-producing device opposed to it. The numerals 19 and 21 are used in connection with Fig. 1 to designate magnets generally but of any of the several forms later described in connection with Fig. 3.

The position of the electromagnets relative to the timbre-forms may best be seen in Fig. 2, where three electromagnets 21, 22 and 23 are shown, each with a wedge-shaped pole extending close to but not contacting with the timbre-form. The right-hand coils about the cores of these magnets are connected in parallel with conductors 24 and 25 having a suitable source 26 of electric energy conventionally represented in Fig. 6 as a battery. A portion of a stacked timbre-form 20 adapted to produce in the energizing coils of the magnets, undulations or pulsations of wave-form having the characteristics of a compound tone of predetermined pitch is shown in Fig. 2, and is opposed by a magnet 21 representing one of the three tone-qualities of the instrument at that particular pitch.

Magnets 22 and 23 which are seen beyond magnet 21, oppose timbre-forms developing the same pitch but of the other two tone-qualities of the instrument, these last-named timbre-forms not being visible in Fig. 2 because they lie beyond and are hidden by the outer lamina, as 14 in Fig. 3.

As it is obvious that I may use more rotors, different speeds, and timbre-forms of wave numbers other than sixteen, seventeen, eighteen and nineteen and their multiples, ly controlled. I do not, however, restrict myself to this type, as there are occasions where other types of flux-generating members more strongly commend themselves despite some added expense and complexity. The magnet 22 comprises a soft iron core 22ᵃ and two separate coils or windings 22ᵇ and 22ᶜ. The core 22ᵃ is magnetized only when a current flows through the coil 22ᵇ, and the degree of this magnetization varies with the variation of the current. When the instrument is being played, more or less current will preferably be flowing through all the coils 22ᵇ associated with and assisting to produce any tone-quality in use, the strength of the current used in the coils 22ᵇ associated with the various tone-qualities being controlled by some form of rheostat operated by any suitable mechanism, such as the draw-stops later described. When, as just explained, the core 22ᵃ is magnetized, the rotation of the compound timbre-form of soft iron in close proximity to it will set up pulsations in the coil 22ᶜ, which pulsations will have the wave characteristics of the predetermined tone-quality. In a small mechanism these pulsations will be relatively weak, but they may be strengthened to any desirable extent by any of the well-known means commonly used for such purpose. One such means based upon radio practice is shown in Fig. 6 and will be hereinafter explained.

I do not limit myself to the particular "pick-up" means shown at 22 in Fig. 3, as various other forms may be used two of which are also shown in said figure. 27 designates a permanently magnetized core around which is a coil 28. The core 27 is preferably wedge-shaped at its coacting end, and as the timbre-form of soft iron moves past the core, electrical pulsations are set up in the coil 28, these pulsations having the wave-characteristic of the predetermined tone-quality as explained in connection with magnets 22.

It is obvious that both of the magnets just described, may, if desired, be of U-form, but in such case both legs of each magnet should be so proportioned relatively to its associated timbre-form, that the apices of the two legs of each magnet core shall be simultaneously passed by the points of greatest radius of the lamina 14 of the proximate timbre-form, which lamina produces pulsations calling forth the fundamental or first component of the compound tone.

A third form of magnet is shown at 29 in Fig. 3, where 29ᵃ designates a wedge-shaped permanently magnetized piece of steel fastened to the movable portion of a microphone capsule 30 from which extends wires 31 and 32 carrying the unidirectional current designed to be pulsated by the action of the moving timbre-form upon the capsule. The difficulty commonly experienced in preventing these microphone capsules from picking up sounds occasioned by the movement of the various portions of the mechanism, and other undesirable noises, ordinarily renders them less suitable in a musical instrument than either of the other forms of magnet described.

Fig. 4 shows a portion of an integral timbre-form consisting of lamina 33 with a central opening 34 permitting it to be threaded upon a shaft or cylinder 35 serving as a rotating member, each end of said shaft being furnished with a journal 17. The periphery of lamina 33 is formed with teeth or crests and with depressions, necessary to produce the wave-characteristics of a predetermined compound tone.

In Fig. 5 is illustrated a segmental portion of a disk-shaped member 36 for carrying timbre-forms, three concentric forms 37, 38 and 39 being shown in the circumferential portion of or near the perimeter of said disk, while others are indicated by dotted lines. Such disk-shaped timbre-form carriers ordinarily have their highest pitched notes near their peripheries, and each such disk, in the cheaper types of instrument, will preferably carry timbre-forms producing pitches appropriate to the running speed of that particular disk in all the different tone-qualities of the instrument. 37 may therefore be understood as designating a relatively high note of violin quality; 38 as the same pitch of flute quality; and 39 as the equivalent pitch but of oboe quality. Such disk type of timbre-form carriers will preferably rotate at the same speeds as the equivalent rotors of Fig. 1, and will carry timbre-forms each having wave cycles of sixteen, seventeen, eighteen or nineteen primes or fundamentals or some proper multiple thereof, as in the case of the stacked timbre-forms of Figs. 1, 3 and 6 and the integral timbre-form shown in Fig. 4.

The disk type of timbre-form illustrated in Fig. 5 commends itself for use in the less expensive instruments, since it admits of production by casting. As, however, the present application concerns the instrument as such and not the method or process of producing the timbre-forms, a special mode of casting which has been developed, and the timbre-form produced by such method, will not be further described herein as separate application will probably be made to protect the same.

It is to be understood that while six rotors and the speeds and timbre-forms above described represent my preferred form of construction in the case of small and relatively inexpensive instruments, I do not confine myself to this embodiment of my invention, as it is obvious that I may use more rotors, different speeds, and timbre-forms of wave numbers other than sixteen, seventeen, eighteen and nineteen and their multiples, and such would be well within the scope of my invention.

It is of course understood that each composite timbre-form must include an element or member suitable to call forth the fundamental or first component of the desired composite tone, but the associated partials or components may be such as will produce other than the second and third components of such tone. In other words, any desired partials or components may be employed to sound with the fundamental or first component in making up the desired composite tone.

Fig. 6 shows a schematic lay-out of an instrument having two manuals, two expression-controls, one for each manual, and three different qualities of tone as, for example, violin, flute and oboe, together with means for playing any or all of said qualities of tone by either of the two manuals at will, and means for evoking any of the several tone-qualities in any desired degree of loudness or entirely quenching the same.

Considering first the tone-generating means shown in the upper left-hand portion of Fig. 6, the numerals 40, 41 and 42 designate respectively a violin, a flute, and an oboe section of three notes each taken from the central shaft 11 of the right-hand group of rotors in Fig. 1. 43 designates another section of the same shaft or rotor 11, showing in greater detail a single stacked composite timbre-form comprising three laminæ each adapted to produce a different component of the predetermined tone. Spacing rings 44, preferably of non-magnetic material, as aluminum, brass, indurated fiber, or other, separate the timbre-forms of all the rotors, and serve to prevent the cores of the magnets from being affected by timbre-forms not properly associated with them. These spacing rings are represented by the similarly placed dark lines of the rotors of Fig. 1. Double-coil magnets, preferably of the type shown at 22 in Fig. 3 having soft iron cores, are opposed to the timbre-forms of sections 40, 41 and 42 of Fig. 6, one such magnet to each timbre-form. Three timbre-forms and their magnets are shown for each of the three sections of the rotors here illustrated, the letters C, C# and D indicating that the magnet and associated timbre-form to which such letter is applied are adapted to produce, respectively, the C-note, the C-sharp-note, and the D-note of the musical scale in the violin, the flute, or the oboe quality, as the case may be. It is to be understood of course that the sections of the rotors in Fig. 6 typify the complete rotors with full number of timbre-forms and magnets, as illustrated in the violin, flute and oboe sections of the several rotors of Fig. 1.

The magnets of the long and short rotors of Fig. 1 and there designated generally by the numerals 19 and 21 are of the same construction and arrangement as the magnets shown in Fig. 6, and are included in like circuits equipped with analogous control devices. Said magnets are energized by a unidirectional current supplied to the outermost coil of each through circuits shown in dotted lines in Fig. 6, and including current source 26 and resistances 45, 46 and 47 traversed respectively by brushes 48, 49 and 50 upon draw-stops 51, 52 and 53. These draw-stops co-act respectively with brushes 54, 55 and 56 from which wires 125 shown in dotted lines, lead back to the outermost coils of the magnets of rotor-sections 40, 41 and 42, thus completing the energizing or direct-current circuits.

As seen in Fig. 6, all of the outermost or energizing coils of the magnets are served by a common wire 57 as to one of their poles, the opposite poles of said magnets being grouped into three sections, each of said sections being served by a common wire 58, 59 and 60. All the wires of this polarity which serve the magnets opposed to violin timbre-forms are in one group, as indicated at 58, all those similarly associated with the flute timbre-forms are in another group as indicated at 59, while those similarly associated with the oboe timbre-forms are in a separate group as indicated at 60. The draw-stops 51, 52 and 53 are each electrically non-conducting at their leftward or darkened halves, so that when a draw-stop, as for example 52, is pushed entirely in, its co-acting brush 55 then bears upon the darkened or insulating part of the draw-stop, thus opening the circuit supplying energizing current to the compound magnets associated with a particular quality of tone, which in this case is the flute quality. If this draw-stop 52 be partly drawn the circuit will be closed but will include a resistance determined by the length of the helical coil 46 included in the circuit. The same principle of action pertains to the other draw-stops, thus permitting the player at will, to cut in or out any of the tone-qualities provided by the instrument, in whole or in part.

I do not confine myself to this particular means of controlling the relative loudnesses of the various tone-qualities, since several other ways within the purview of my invention may be employed. In some cases the different qualities of tone may be separately graded through the use of additional pedals for each manual, the pedal 67 seen in Fig. 6 being merely typical of others which may be employed. I show another means of cutting in or out any particular tone-quality by the switch 61 acting upon the generated pulsating current instead of upon the unidirectional energizing current. By throwing this switch 61 the circuit serving the speaking magnet 62 is opened or closed at that point. At 63 I show a grading means mechanically acting upon the speaking magnet 64 and adapted to withdraw said magnet from or push it nearer to the diaphragm of horn 65. This movement is brought about by the spring-controlled bell-crank or lever 66 acting through the agency of a pedal or stop, as for example pedal 67, to push the magnet-carrying stem or rod 68 to the right against the action of spring 69 or spring 70, or both, thus carrying the magnet 64 upon the end of stem 68 nearer to the diaphragm of horn 65, the degree of depression of pedal 67 determining the loudness of the tone.

In an instrument of this character having a plurality of manuals, two of which I show herein, it is desirable to be able to put any of the several tone-qualities provided by the instrument upon any of its manuals, for it is common practice to play an air upon one manual and an accompaniment upon another. In such case, as in many others, it is further desirable to be able to select for each manual the preferable tone-qualities as well as their relative loudnesses where a plurality of tone-qualities are simultaneously used upon one manual. The means for grading these tone qualities relative to each other has already been described, and I shall now describe the mechanism for the placement, as to manuals, of the tone-qualities of the instrument here illustrated.

In the lower right-hand portion of Fig. 6 are shown twelve pairs of co-acting contacts designated "Upper manual", while to the left thereof and slightly lower, is shown another group of twelve pairs of co-acting contacts designated "Lower manual". The twelve co-acting contacts of each manual represent four notes of the musical scale, that is, C, C♯, D and D♯ on the upper manual, and the same pitched C, C♯, D and D♯ for the lower manual, each group of three pairs of co-acting contacts being marked on each manual with the note of the scale with which said group is associated. In each of said groups the upper pair of contacts 71 is associated with the violin quality of tone, the lower pair 72 in each group is associated with the oboe quality of tone, and the middle pair 73 of each group with the flute quality. The three-membered expression control 74 for the upper manual is actuated by a pedal 75, and serves to grade all the tones played upon the upper manual of the instrument. A similar expression-control 76 for the lower manual serves, through the agency of a pedal 77 to give proper musical expression to all the tones played from the lower manual. It is to be understood of course that there will ordinarily be eighty-four notes to each manual with three pairs of co-acting contacts for each note, all connected with the expression-control devices 74 and 76 in the manner shown in Fig. 6 for the four notes there illustrated. These expression-controls will be more fully explained hereinafter.

Describing now the mechanism whereby the various tone-qualities of the instrument are placed in command of the manual or manuals desired, three rotatable cylindrical members 78, 79 and 80, each shown as broken away and marked respectively Violin, Flute and Oboe to indicate the qualities to which they pertain, are each provided with eighty-four sections of which three are shown and designated by the numerals 82, 83 and 84, these sections being electrically insulated from one another. Upon the upper halves of said sections are brushes assigned, as here illustrated, to the notes C, C# and D, it being understood of course that there is one such brush for each of the eighty-four sections of each cylinder 78, 79 and 80. Extending longitudinally throughout each of said cylinders is an insulating strip 85, the function of which is to open-circuit all brushes which may be brought to rest upon the insulating strip of any of the cylinders through turning such cylinder by hand-wheel 86 or equivalent means. Upon the lower half of each section 82, 83, 84, etc. of each cylinder, are two brushes 87 and 88 of unequal lengths, to permit the placing of either brush upon the insulating strip 85 while keeping the other clear thereof. The brushes 87 serve the lower manual while the brushes 88 serve the upper manual of the instrument.

Suppose, for example, it be desired to place the violin quality in command of the lower manual of the instrument; the cylindrical member 78 will be turned by its hand-wheel 86 into the position shown in Fig. 6, when the current from the C-note brush will pass around the section 84 to the lower shorter brush 87 of that section, and thence to the appropriate key of the lower manual. The longer brush 88 of this section 84 being on the insulating strip 85 will receive no current to pass to the upper manual, which will therefore remain dead as to this violin quality of tone. The middle cylindrical member 79 shows a different condition of affairs, for here its quality of tone, that is, the flute quality, is passed on to the control of the upper manual as will be readily understood.

Recurring now to the expression-control mechanism, the control 74 for the upper manual has three sections 89, 90 and 91, used respectively for the violin, flute and oboe qualities, when such qualities are associated with the upper manual. The control 76 for the lower manual has three similar sections 92, 93 and 94 likewise used for the violin, flute and oboe qualities respectively, when these qualities are in command of the lower manual of the instrument. As shown in the drawings, the sections of each of these three-membered rheostats are insulated from each other so that any degree of loudness which is given to a particular tone-quality by the control, through its appropriate draw-stop, of the unidirectional current energizing its associated magnets, may still further be controlled through action upon the pulsating current corresponding to said quality, by the positioning of the expression-control associated with the manual from which said quality is being played.

The resistance-means serving as the expression-controls 74 and 76 and having as herein described to deal with an undulatory current, may be in the form shown in detail in Fig. 8, but I do not limit myself to any particular form of impedance, resistance or control, since any means serving suitably to control the loudness of the tones at all times, at the will of the player, is quite within the scope of my invention. In said Fig. 8, 95 designates a circular disk with a relatively narrow face carrying contact blocks 96 insulated from each other and from the disk throughout the circumference thereof. Most of these contact blocks 96 are near together and are therefore insulated by relatively narrow sections 97, but one section, 98, is very long, and is always traversed by a brush 99, a double-pronged brush 100 traversing the shorter sections when the associated pedal rod 75 or 77 is actuated. To each of these shorter conducting sections 96 is wired the radially outermost end of an impedance coil 101, or other current-reducing member. The opposite or inner end of each of said coils 101 is joined by a wire 102 to the top of coil 101 next to it in a clockwise direction, with the exception of the inner end of coil 103 which is electrically joined to the long conducting section 98 which is always in contact with the brush 99 as before explained. When, through adjustment or partial rotation of disk 95, any given contact block 96 thereof is brought beneath and into contact with the double-pronged brush 100, current will pass from said brush and the block 96 upon which it bears to the coil 101 connected with said block, and thence clockwise by the successive wires 102 and coils 101 between the contact blocks 96, to the long contact section 98 and the contact brush 99, said brushes being wired in the manner shown and described in connection with Fig. 6. The current will, under any adjustment, be reduced from normal to the extent of the resistance coils 101 interposed between the brush 100 and the conducting section 98 of disk 95. If the pedal 75 (or 77) be moved downward sufficiently to carry all the short sections 96 of disk 95 past, and to bring the long section 98 thereof beneath and in contact with, the double pronged brush 100, no impedance or resistance will be inserted, and the tone will be at its maximum intensity so far as the expression-control is concerned.

For the purpose of turning or partially rotating the disk 95 to carry the contact blocks 96 to and beneath the bifurcated brush 100, I have shown a crank-arm 104 made fast upon a shaft 105 which carries the several disks 95, and a rod 106 connecting the outer end of said arm with the pedal 75 or 77 as the case may be. Depression of the pedal moves the disk 95 in an anticlockwise direction indicated by the arrow in Fig. 8. To return the disk to normal adjustment under which the maximum resistance would be interposed between brush 100 and conducting section 98, and maintain it in such adjustment, any suitable means may be provided. In Fig. 8 I have shown a drum or pulley 107 to which is attached and upon which winds, a flexible band, rope, or the like, 108, carrying a weight 109. Any equivalent for this arrangement may be employed, as for instance, a spring connected at its upper end to the band 108 and at its lower end to a fixed anchorage. A rack and pinion connection may likewise be used in place of the crank-arm 104.

The present invention contemplates the use of any one of a variety of amplifying or intensifying and reproducing mechanisms, one of which is illustrated in the upper part of Fig. 6. As there shown, secondary coils 110, 111 and 112 are associated respectively with primary coils 113, 114 and 115, each primary and its associated secondary being related to one of the tone-qualities of the instrument, as for example, primary 115 and secondary 112 are associated with the oboe quality of tone. Connected with said secondary 112 is an amplifying or intensifying and reproducing means comprising a radio tube 116 with its associated parts, as coils 117, 118, switch 61, speaking magnet 62 and horn 65. This particular amplifying or intensifying and reproducing means is merely illustrative, and may obviously be used interchangeably with any of a variety of well-known means for the same purpose. In the claims the term "amplifying" is employed, but it is to be understood that this is intended to cover any procedure for increasing the volume and/or loudness of the resulting tones.

Referring now to Fig. 7, 119 designates the forward end of a key of one of the manuals of the instrument, equipped to depress simultaneously the three pairs of contact members 71, 72 and 73 seen in Fig. 6, only one pair of such contact members, designated 71ª, being shown in Fig. 7 since the three pairs lie in common plane and two are hidden from view. The key 119 carries on its under side a tongue spring 120 which may be set more or less away from the under surface of said key by an adjusting screw 121. The spring 120 carries at its free end a transversely arranged bar 122 of hard rubber or other suitable insulating material, of a length sufficient to bridge the upper members of the three pairs of contacts typified by 71ª. Under this arrangement the depression of key 119 will force down spring 120, causing the bar 122 to bear upon and depress the upper member of each pair of contacts such as 71ª, into electrical contact with the lower member of each pair. In Fig. 6 the lower member of each contact pair 71, 72 and 73 is extended in the reverse direction from that in which said contacts are shown in Fig. 7, but this is done merely to permit both members of each pair to be seen in Fig. 6 as they would not clearly be if one set lay immediately over the other.

The mechanism may be driven by any appropriate prime mover, an electric motor being well adapted to the purpose. So, too, a housing for the instrument is well within the skill of mechanics accustomed to building pianos, organs, and other musical instruments, and their enclosing cabinets or casings, and may be varied at will; hence need not be described or illustrated herein. It is of course understood that suitable supports and bearings for the various shafts will be provided, but as these are usual and well-known in structures of this character, it has been deemed unnecessary to illustrate the same.

Having thus described the various parts of the instrument and their functions, the operation of the same when in use will now be briefly stated. Shaft 1 and fly-wheel 2 being caused to rotate at nine hundred and seventy revolutions a minute, the six rotors and their associated timbre-forms geared to and driven by said shaft, will revolve at the correct speeds to cause each timbre-form, when made to speak, to give forth its correct note in the tempered scale with a predetermined tone-quality depending upon the characteristics of such timbre-form. Turning now to Fig. 6, the draw-stop 51 is shown fully drawn so that current from source 26 flows by wires 123, 124, resistance-member 45, brush 48, conducting portion of draw-stop 51, brush 54, wire 125, common wire 58, thence through the outermost coils of magnets C, C# and D of violin rotor-section 40 to the common return wire 57, and back to source 26. Brush 48 being too far to the left to introduce any material portion of the coils of resistance-member 45 into the circuit, the magnets associated with the violin quality will be fully energized. The draw-stop 52 being pushed in until brush 55 rests on the insulated portion of said stop, the flute quality is cut out entirely. The stop 53 being more than half drawn, only a portion of resistance 47 is in circuit, and the oboe magnets will therefore be energized with more than half their maximum strength. Under these conditions, if a player press the C-key of the upper manual, the three pairs of contacts beneath the key will be brought together to complete the like number of electric circuits, but since the flute quality is cut out at 55, no current will traverse the central pair of contacts. Turning now to the cylindrical members 78 and 80, it will be seen that all the upper manual brushes 88 rest upon the insulating strip 85 so that the violin and oboe qualities are given to the lower manual. The upper manual therefore will not respond to any quality upon any note.

Considering now the lower manual with the draw-stops remaining as just described and the C-key depressed, it will be seen that both violin and oboe qualities are upon the lower manual, the flute being out altogether, and the magnets associated with the violin quality being more strongly energized than those associated with the oboe quality. Taking first the C-magnet of the violin rotor-section 40 whose core as we have seen has its maximum strength, as the associated timbre-form passes close to such core, pulsatory current is generated in its radially inner coil, which current flows by wire 126, brush C, section 84 of cylinder 78, the short lower brush 87 of said section, wire 127, C-key contact pair 71 of the violin section of the lower manual, wire 128, brush 100, pedal-introduced portion of the lower manual violin rheostat-section 92 of expression-control 76, brush 99 of the violin section of said expression-control, wire 130, primary coil 113, wire 131 back to the other pole of the radially inner coil of magnet C of the violin rotor-section 40. Secondary coil 110 is associated with the violin-speaking horn 65, and is electrically connected therewith in essentially the same manner that the oboe horn is connected with the secondary coil 112 of primary coil 115 through intermediate connections above noted.

Considering now the oboe circuit completed by the pressure of said lower manual C-key, the core of magnet C of the oboe rotor-section 42 being less strongly magnetized than the core of magnet C of the violin rotor-section 40, a weaker flux is set up in that coil of the oboe magnet which is next to its associated timbre-form, and this pulsatory current passes by wire 132, brush C, section 84 of cylinder 80, the short lower brush 87 on said cylinder, wire 133, brush 72 of the C-key group of contacts for the lower manual, wire 134, brush 100 of section 94 of expression-control 76 actuated through pedal 77, brush 99 of section 94 of said expression-control 76, wire 135, primary coil 115 and wire 136 back to the other pole of the radially-inner coil of magnet C of oboe rotor-section 42. The pulses of coil 115 are inductively taken up by secondary coil 112, and are enlarged as desired by the radio-tube 116 and associated parts as before explained, and the electrical enlargement thereof delivered to magnet 62 which converts it into a sonorous equivalent through the agency of oboe horn 65.

I do not confine myself to the particular enlarging means illustrated since, as above indicated, numerous means to that end are common and well known. Nor do I confine myself to the use of a separate horn for each tonal quality, as a single horn may be used for a plurality or for all of the tone-qualities comprehended by the instrument, suitable enlarging means being employed in connection with each horn, whether one or more. Except where expense dictates otherwise, I prefer a separate horn for each tone-quality when a plurality of tone-qualities are sounded simultaneously, since experience has taught me that this method gives the best musical results. Nor do I wish to confine myself to any particular grading means for an expression-control, since any of the well-known means for such purpose would be within the scope of my invention, and I have shown a plurality of such means in Fig. 6, one of these being illustrated in further detail in Fig. 8.

It will be noted that in this instrument all rubbing contact of moving parts in the actual music-producing devices is avoided, thus eliminating wear which would otherwise be inevitable, occasion undesirable changes in the rendition of tones, and involve constant or frequent repair, adjustment, or both, to maintain the instrument in perfect playing condition. The only rubbing contacts in such portion of the illustrated mechanism are in the expression-control devices 74, 76, 78, 79 and 80, and these parts have but occasional movement and always of short range and brief duration, hence involving only negligible wear.

It is of course common to operate mechanically the keys of pianos, organs, and other manually operable instruments, and many types of mechanism for effecting such operation are well known and in extensive use. It is hence unnecessary to illustrate or to describe in detail mechanical playing devices for the instrument here disclosed, but the use thereof in connection with said instrument is within the purview of the present invention.

It will be noted that what is termed the "violin" extends throughout the range of the instrument, while the ordinary violin is of much shorter gamut, so that the violin quality in the instrument here described must be understood to mean the characteristic timbre of the violin carried into other ranges of pitch, as for example, those normal to the viola, cello, and double bass: in short, the whole "violin family" so-called. Similarly, with regard to the other two qualities mentioned, they are to be understood as carrying their characteristic timbres to similar new ranges of pitch, either with exactitude or, where imitation of orchestral instruments be desired, with such minor modifications as are necessary to produce the unevenness of scale which instrument makers have so far been unable to overcome.

What is claimed is:—

1. In a musical instrument capable of producing the tones of a musical scale, means including a plurality of relatively timed revoluble members, for generating a multiplicity of series of electrical waves, each of said series being of a periodicity and form suitable to produce its distinctive note of the muscal scale and a selected compound tone-quality of the instrument; means for grading the power of said electrical waves for purposes of musical expression; means for amplifying said electrical waves; and means for converting said waves into sonorous vibrations.

2. In a musical instrument operable by or through a key-manual, means including a plurality of relatively timed revoluble members, for generating a multiplicity of series of electrical waves, some of the several series being more or less complex and each of said series being of a periodicity and form suitable to produce its distinctive note of the musical scale and one of the tone-qualites of the instrument; means for grading the power of said electrical waves for purposes of musical expression; means for amplifying said waves; and means for translating the amplified waves into sonorous vibrations.

3. In a musical instrument operable manually or mechanically at will and capable of producing a plurality of tone qualities: timbre-forms each having impressed upon it the necessary partial components in their proper relative intensities to produce the characteristic wave-form of the predetermined timbre desired; a plurality of members carrying said timbre-forms, certain of said timbre-forms rotating at relative speeds corresponding to the incommensurate ratios of the equally tempered scale; magnetic or pick-up means in proximity to each timbre-form and constituting therewith a pulsation-producing unit, one of said units being provided for each note of the musical scale in the several tone-qualities of the instrument; means for grading the power of the electrical waves produced by the pulsation-producing units, for purposes of musical expression; means for amplifying the graded waves; and means for converting said waves into sonorous vibrations.

4. In a musical instrument capable of producing a plurality of tone qualities, a multiplicity of electrical pulsation-producing units each comprising a magnetic or pick-up member and a timbre form movable in proximity thereto, the various timbre-forms rotating at such relative speeds as shall cause them to generate vibrations of the relative periodicities of the tempered scale, and certain of said timbre-forms serving when moved in relation to their associated magnetic or pick-up members each to generate electrical pulsations composed of a plurality of partial components; means for grading the pulsations or vibrations produced for purposes of musical expression; means for amplifying the power of said vibrations or pulsations; and means for converting the enlarged vibrations or pulsations into sonorous vibrations.

5. In a musical instrument operable manually or mechanically at will, repetitious, compound timbre-forms and associated pick-up means juxtaposed thereto, said timbre-forms rotating at such speeds as shall cause them to generate vibrations of the relative periodicities of the tempered scale including those periodicities which are incommensurate in such scale, and said timbre-forms and pick-up means serving, when relative motion is produced between two of them as associate members in a co-acting pair, to vary the intensity of a magnetic field existing between said members and to set up electrical pulsations substantially of the wave characteristics impressed upon the co-acting timbre-form; means for grading said pulsations for purposes of musical expression; means for amplifying said pulsations; and means for converting said pulsations into sonorous vibrations of the timbre desired.

6. In a musical instrument adapted to produce a plurality of different tone-qualities, six rotatable timbre-form-carrying members; gearing connecting the power shaft of one of said members with the shafts of the other members and serving to rotate the several members at appropriate relative speeds; timbre-forms upon said members adapted, in connection with associated magnets, to produce at each revolution fundamental pulsations to the number of sixteen, seventeen, eighteen, nineteen, or some proper multiple thereof; means for grading the pulsations for purposes of musical expression; means for amplifying said pulsations; and means for converting the electrical pulsations into sonorous waves of the predetermined tone-quality desired.

7. In a musical instrument adapted to produce a plurality of different tone-qualities, six rotatable timbre-form-carrying members; gearing connecting the power shaft of one of said members with the shafts of the other members and serving to rotate the several members at appropriate relative speeds; timbre-forms upon said members adapted in connection with electrical pick-up mechanism, to produce at each revolution of their associated timbre-form-carrying members, compound electrical pulsations having fundamentals to the number of sixteen, seventeen, eighteen, or nineteen, or some proper multiple thereof; means for grading the pulsations for purposes of musical expression; means for amplifying said pulsations; and means for converting the electrical pulsations into sonorous waves of the predetermined quality desired and of the intensity requisite for proper musical expression.

8. In a musical instrument adapted to produce a plurality of different tone-qualities, rotatable timbre-forms, one for each note of the musical scale and for each of the several tone-qualities of the instrument, each timbre-form repetitiously representing a plurality of partial components and certain of said timbre-forms rotating at such speeds relative to the others as shall cause them to generate pulsations of the periodicities characterizing the incommensurate ratios of certain notes of a tempered scale; electrical pulsation-producing means juxtaposed to and associated with each timbre-form, and generating electrical undulations of a wave-form determined by the characteristics of the co-acting timbre-form; means for grading the power of the electrical undulations for purposes of musical expression; means for amplifying the graded undulations; and means for converting such undulations into tones of the predetermined quality and desired intensity.

9. In a musical instrument adapted to produce a plurality of tone-qualities and provided with a plurality of manuals; correctly timed rotative means for generating a multiplicity of series of repetitious compound electrical pulsations; means for grading said pulsations for purposes of musical expression; means for placing any manual in control of any of the tone-qualities of the instrument at will; means for amplifying the electrical pulsations; and means for converting said amplified electrical pulsations into sound of similar wave characteristics.

10. In a musical instrument adapted to produce a plurality of tone-qualities and provided with a plurality of manuals; correctly timed rotative means for generating a multiplicity of series of repetitious compound electrical pulsations, one such series for each tone-quality at every pitch in the gamut of the instrument; means for grading said pulsations for musical expression; means for placing any manual in control of any of the tone-qualities of the instrument, at will; means for amplifying the graded pulsations; and means for converting said amplified pulsations into sound of similar wave-characteristics.

11. In a musical instrument adapted to produce a plurality of tone-qualities and provided with a plurality of manuals; correctly timed rotative means for generating a multiplicity of series of repetitious electrical pulsations adapted to produce all the tone-qualities of the instrument at every pitch in the gamut thereof; means for controlling at will the relative intensities of the tone-qualities; means for placing any manual in control of any of the tone-qualities of the instrument at will; means for grading the power of the electrical pulsations for purposes of musical expression; means for amplifying said pulsations; and means for converting said amplified pulsations into sonorous equivalents.

12. In a musical instrument adapted to produce a plurality of tone-qualities and provided with a plurality of manuals, correctly timed rotative means for generating a multiplicity of series of repetitious electrical pulsations adapted to produce all the tone-qualities of the instrument at every pitch in the gamut thereof; means operable at will for silencing any tone-quality or determining the intensity of its speech relative to any other quality or qualities simultaneously sounding; means operable at will for placing any manual in control of any of the tone-qualities of the instrument at will; means for grading the power of the electrical pulsations for purposes of musical expression; means for amplifying said pulsations; and means for converting said amplified pulsations into sonorous equivalents.

13. The herein described method of producing compound tones of predetermined musical quality, which consists in generating in a magnetic circuit electrical pulsations of the wave-characteristics necessary to produce the pitches and tone-qualities desired; passing said electrical pulsations to means for grading them for purposes of musical expression; passing the graded pulsations to means for amplifying the same; and passing said amplified pulsations to means for converting them into sonorous vibrations representative of the predetermined tone-quality desired.

14. In a musical instrument capable of producing the tones of a musical scale, a plurality of differently speeded but relatively timed rotating members; means for generating thereby through proximate magnetic or pick-up means, each said pick-up means simultaneously responding to a plurality of differently timed impulses, a multiplicity of series of electrical waves, each of said series being of a periodicity and form suitable to produce its distinctive note of the musical scale and a selected tone-quality of the instrument; means for grading the power of said electrical waves for purposes of musical expression; and means for converting said waves into sonorous vibrations.

15. In a musical instrument capable of producing the tones of a musical scale, differently speeded but relatively timed means for generating a multiplicity of series of electrical waves, said means including pick-up members each simultaneously responding to a plurality of differently-timed impulses, and each of said series being of a periodicity and form to produce its distinctive note of the musical scale and a selected tone-quality of the instrument; current regulating means for grading the power of said electrical waves for purposes of musical expression; and means for converting said waves into sonorous vibrations.

16. In a musical instrument capable of producing the tones of a musical scale, differently speeded but relatively timed means for generating a multiplicity of series of electrical waves, said means including pick-up members each simultaneously responding to a plurality of differently-timed impulses, and each of said series being of a periodicity and form to produce its distinctive note of the musical scale and a selected tone-quality of the instrument; means for grading the power of said electrical waves for purposes of musical expression; and means for converting said waves into sonorous vibrations.

17. In a musical instrument capable of producing a plurality of tone-qualities, a multiplicity of differently speeded but relatively timed electrical pulsation-producing units each comprising a magnet and a timbre-form movable in proximity thereto, each of said timbre-forms adapted when so moved in relation to its magnet, to generate electrical pulsations composed of a plurality of partial components; means for grading said pulsations for purposes of musical expression; and means for converting said pulsations into sonorous vibrations.

18. In a musical instrument adapted to produce a plurality of different tone-qualities, six rotatable timbre-form-carrying members; driving means connecting the power shaft of one of said members with the shafts of the other members and serving to rotate the several members at appropriate relative speeds; timbre-forms upon said members adapted, in connection with associated magnets, to produce at each revolution pulsations to the number of sixteen, seventeen, eighteen, nineteen, or some proper multiple thereof, each said associated magnet responding to a plurality of differently-timed impulses; means for grading the pulsations for purposes of musical expression; and means for converting the electrical pulsations into sonorous waves of the predetermined tone-quality desired.

19. In a musical instrument adapted to produce a plurality of tone-qualities and provided with a plurality of manuals; differently speeded but relatively timed means for generating a multiplicity of series of repetitious compound electrical pulsations, said means including a multiplicity of pick-up members each of which is simultaneously responsive to a plurality of differently-timed repetitious compound electrical pulsations, for purposes of musical expression; means for placing any manual in control of any of the tone-qualities of the instrument, at will; and means for converting the electrical pulsations into sound of similar wave characteristics.

20. In a musical instrument capable of producing the tones of a musical scale, means including members in rotor and stator relations to each other, for generating a multiplicity of series of electrical waves, each of said series being of a periodicity and form suitable to produce its distinctive note of the musical scale and a selected compound tone quality of the instrument; means for grading the power of said electrical waves for purposes of musical expression; means for amplifying said electrical waves; and means for converting said waves into sonorous vibrations.

21. In a musical instrument capable of producing the tones of a musical scale, a plurality of differently speeded but relatively timed rotating members; means for generating thereby through proximate magnetic or pick-up members each simultaneously responsive to a plurality of differently-timed impulses, a multiplicity of series of electrical waves, each of said series being of a periodicity and form suitable to produce its distinctive note of the musical scale; means for grading the power of said electrical waves for purposes of musical expression; and means for converting said waves into sonorous vibrations.

In testimony whereof I have signed my name to this specification.

MELVIN L. SEVERY.

CERTIFICATE OF CORRECTION.

Patent No. 1,893,250.  January 3, 1933.

MELVIN L. SEVERY.

It is hereby certified that error appears in the printed specification of the above numbered patent requiring correction as follows: Page 11, line 58, claim 19, strike out the words "repetitious compound electrical" and insert instead "impulses; means for grading said"; and that the said Letters Patent should be read with this correction therein that the same may conform to the record of the case in the Patent Office.

Signed and sealed this 21st day of February, A. D. 1933.

M. J. Moore,
Acting Commissioner of Patents.

(Seal)